Oct. 14, 1952      P. D. MIZE      2,613,736

MACHINE FOR APPLYING SOLID RUBBER TIRES TO WHEEL RIMS

Filed Sept. 23, 1948      5 Sheets-Sheet 1

INVENTOR.
Paul D. Mize.
BY
Harness, Dickey & Pierce.
ATTORNEYS.

Oct. 14, 1952 P. D. MIZE 2,613,736
MACHINE FOR APPLYING SOLID RUBBER TIRES TO WHEEL RIMS
Filed Sept. 23, 1948 5 Sheets-Sheet 2

INVENTOR.
Paul D. Mize.
BY
Harness, Dickey & Pierce
ATTORNEYS.

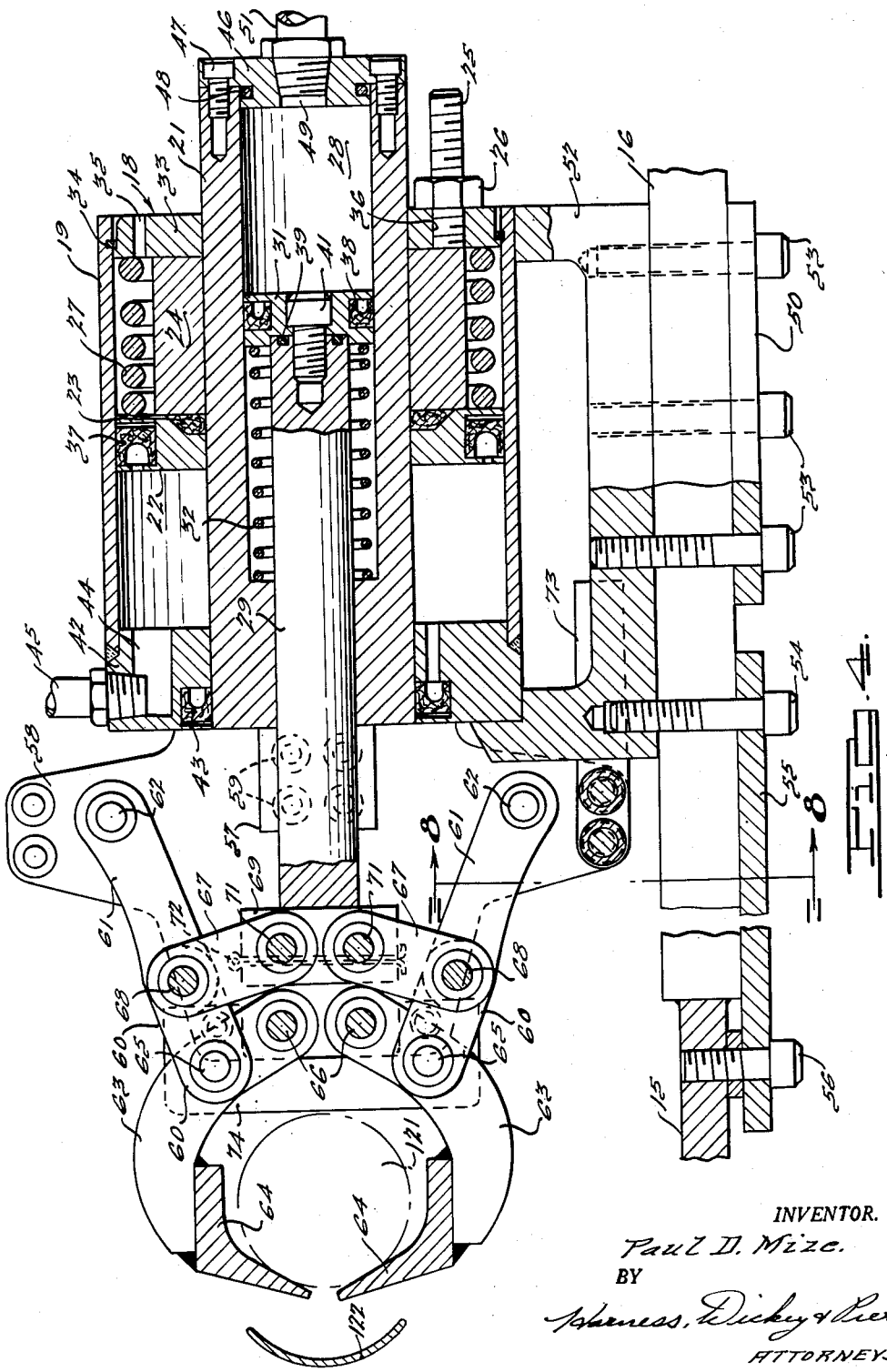

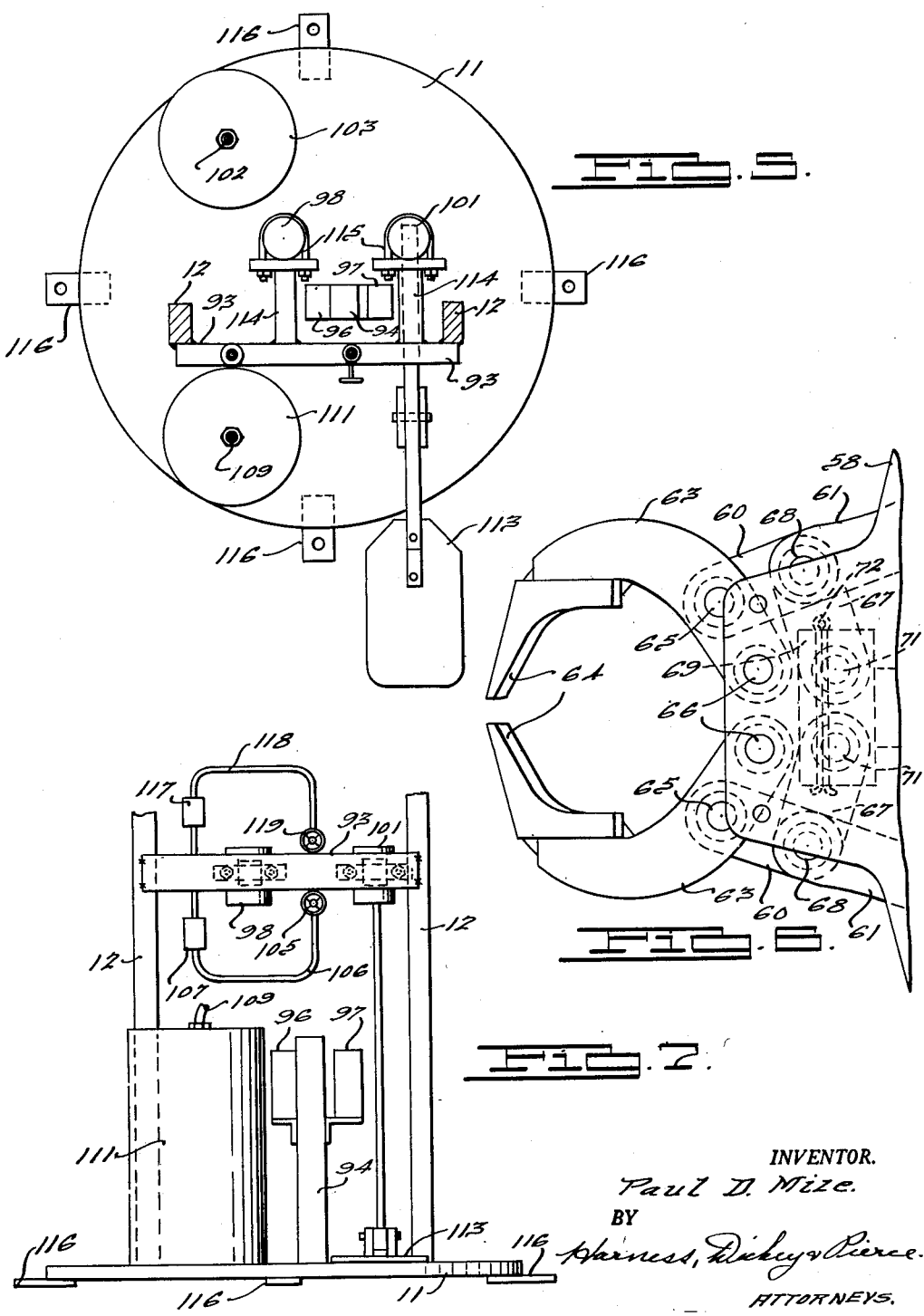

Oct. 14, 1952 P. D. MIZE 2,613,736
MACHINE FOR APPLYING SOLID RUBBER TIRES TO WHEEL RIMS
Filed Sept. 23, 1948 5 Sheets-Sheet 5
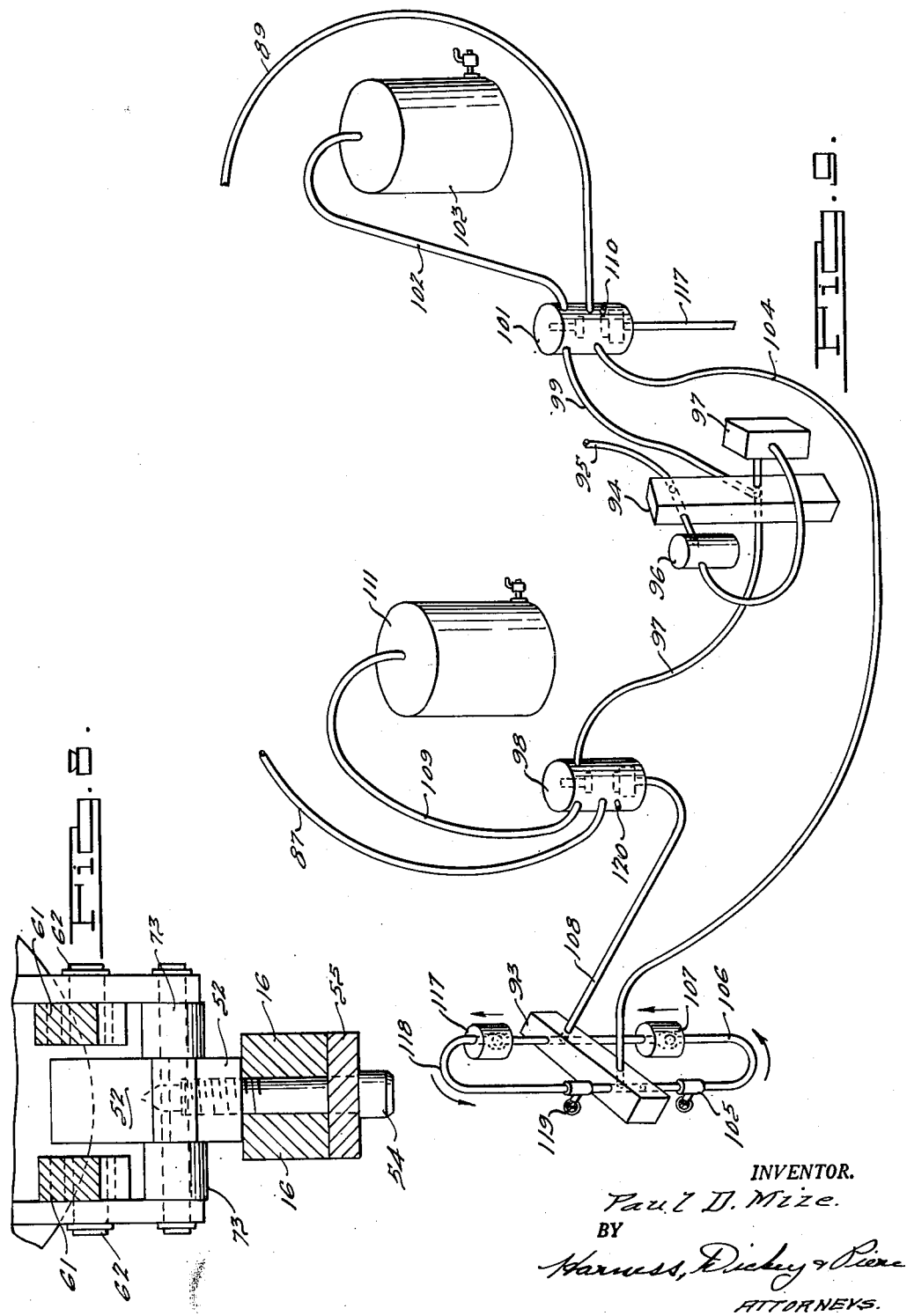
INVENTOR.
Paul D. Mize.
BY
Harness, Dickey & Pierce
ATTORNEYS.

Patented Oct. 14, 1952

2,613,736

UNITED STATES PATENT OFFICE 2,613,736

MACHINE FOR APPLYING SOLID RUBBER TIRES TO WHEEL RIMS

Paul Douglas Mize, Detroit, Mich.

Application September 23, 1948, Serial No. 50,712

13 Claims. (Cl. 157—1.1)

This invention relates to tire applying devices for machines, and particularly to a device for stretching a circular tire and applying it to a rim of a wheel.

Difficulty has always been experienced heretofore in the art in applying a circular rubber tire to the rim of a wheel. This was usually done by a device that rolled and stretched the tire directly on the rim, which usually resulted in the tread on the tire appearing twisted after the tire application.

The present invention pertains to a device having a plurality of jaws between which the tire is disposed. Jaw mechanism is actuated for gripping the tire at equally spaced points about its periphery and for drawing the tire outwardly from the center to enlarge its circumference. The rim is then disposed within the stretched tire and the mechanism released to permit the tire to snap upon the rim. In such a machine the tire is stretched radially outwardly and therefore is not twisted so that the tread will accurately follow the circumference of the wheel.

An annular base is provided on which a plurality of cylinders are secured in a manner to be adjusted radially of the base so that tires of different diameters may be applied by the machine. The cylinder carries a piston and a piston rod in which a cylinder is provided for operating a second piston which actuates toggles for closing clamshell-like jaws about the tire, after which the first piston is actuated within the cylinder to move the jaws radially outwardly to stretch the tire held thereby. A rim may be then placed within the area of the stretched tire and the mechanism released to permit the tire to retract about the rim. Thereupon, the rim and tire are removed from within the jaws and the machine is in position for a repeated operation.

Accordingly, the main objects of the invention are: to provide a machine for radially stretching a solid tire for applying the tire on the rim of a wheel; to provide an annular base on which a plurality of mechanisms are adjustably disposed for operating on circular tires of different diameters for applying the tires to various diameter wheel rims; to provide an annular base on which a plurality of cylinders are adjustably mounted for operating a piston for retracting jaws which clamp the tire after the jaws have been moved into engagement therewith for stretching the tire preparatory to applying it to a rim; to provide a device having a base carrying a plurality of tire stretching devices with means for positioning the tire relative to the devices both radially and in the plane of the devices; to provide actuating mechanism for the gripping and stretching devices for a tire which is completely automatic for gripping the tire at a plurality of points throughout its circumference and for moving the gripping elements axially and for thereafter releasing the gripping elements for permitting the tire to retract without twisting about the rim of the wheel placed within the stretched tire; and, in general, to provide a solid tire applying device which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Fig. 4 is an enlarged broken sectional view of the structure illustrated in Fig. 2, taken on the line 4—4 thereof;

Fig. 5 is a sectional view of the structure illustrated in Fig. 1, taken on the line 5—5 thereof;

Fig. 6 is an enlarged broken view of the structure illustrated in Fig. 2, taken on the line 6—6 thereof;

Fig. 7 is a front view of the structure illustrated in Fig. 5;

Fig. 8 is a sectional view of the structure illustrated in Fig. 4, taken on the line 8—8 thereof, and Fig. 9 is a diagrammatic view of the fluid circuit employed for controlling the actuation of the machine illustrated in the foregoing figures.

Figure 1:
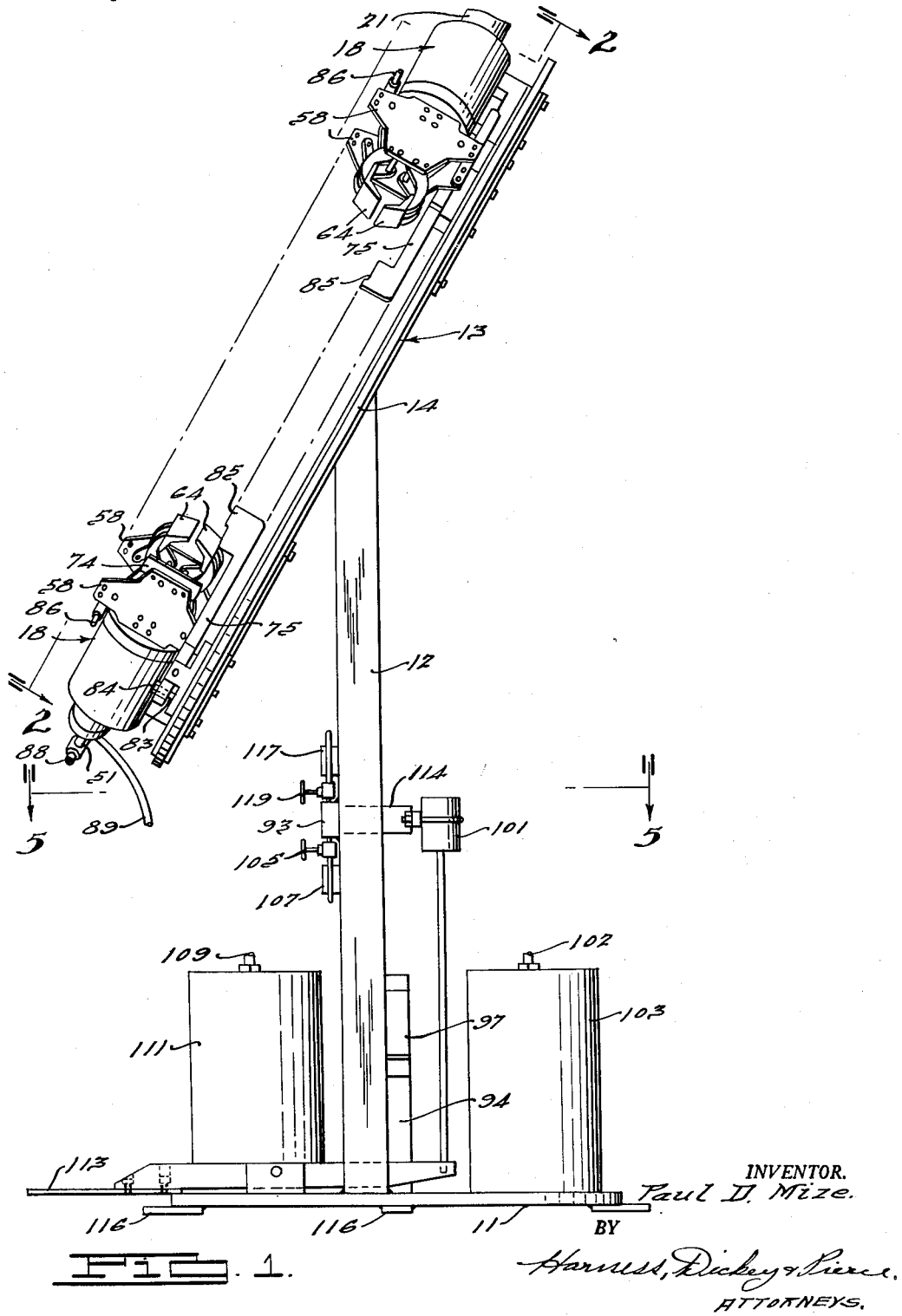
Figure 1 is a broken view, in side elevation, of a tire applying device embodying the present invention.

The machine for stretching and applying the tire to a rim comprises a plate 11 having a pair of standards 12 extending upwardly therefrom for supporting an annular base 13 at an angle to the vertical. The base 13 embodies an outer ring 14 and an inner annular plate 15 joined by pairs of spokelike rods 16 and 17 in predetermined spaced relation to each other. In the device herein illustrated, the spokelike pairs of rods 16 are spaced 45° apart, while three of the pairs of spokelike rods 17 at the bottom portion of the base are likewise spaced 45° apart and disposed midway between the spokelike elements 16. Additional pairs of the spokelike elements 17 are provided at the top between the right and left top pairs of the spokelike elements 16 for a purpose which will be explained more fully hereinafter.

Each of the spokelike elements 16 supports gripping and stretching devices 18 illustrated in detail in Figs. 4, 6 and 8. The devices 18 embody a cylinder 19 having a piston rod 21 therein on which a piston 22 is secured, herein illustrated as by welding at 23. A stop ring 24 is mounted within the cylinder 19 about the piston rod 21, adjustable lengthwise of the cylinder by a setscrew 25 secured in adjusted relation by a nut 26. About the stop ring 24 a coil spring 27 is mounted for urging the piston 22 forwardly in the cylinder. The piston rod 21 is provided with a cylinder 28 in which a piston rod 29 is operated by a piston 31 on the inner end thereof. A coil spring 32 is mounted about the piston rod 29 between the left-hand end of the cylinder 28 and the piston 31 for urging the piston rod 29 to the right within the cylinder. The end of the cylinder 19 is enclosed by a cap 33 which is retained in position by a snap ring 34. A drain aperture 35 is provided through the cap and a threaded aperture 36 is provided therein for supporting the threaded stud 25. Packing material 37 is provided about the piston 22, while similar packing material 38 is disposed about the piston 31.

An O-ring 39, of neoprene or similar resilient material, seals the end of the piston rod 29 from the piston 31 through the center of which a supporting screw 41 is utilized for securing the piston on the end of the rod. The left-hand end of the cylinder 19 has a head 42 welded thereto which is provided with a packing material 43 for sealing the piston 21. A port 44 is provided through the head 42 to which a conduit 45 is threaded. The right-hand end of the cylinder 28 is enclosed by a head 46 secured thereto by a plurality of screws 47 and sealed by a resilient O-ring of neoprene or other resilient material 48. A port 49 is provided through the head 46 to which a conduit 51 is connected through a threaded engagement therewith.

The bottom of the cylinder 19 has a bracket 52 welded or otherwise secured thereto on the center line thereof. The bracket, as illustrated in Fig. 8, is of sufficient width to span the two rods 16 which form the spokelike elements above referred to, to which it is clamped by a plurality of screws 53 extending through a plate 50 abutting the bottom face of the rod 16. As viewed in Fig. 4, the screws 53 are employed to clamp the cylinder onto the spokelike rods 16, assisted by a screw 54 which is also employed as a positioning screw. The screw 54 projects through one of a plurality of plates 55 of various lengths which is secured to the annular plate 15 by a screw 56, thereby positioning the cylinder at different but accurate radial spacing from the center of the base 13. In other words, if a two-inch larger rim were to have a tire applied thereto, a plate 55 one inch longer in length would move all of the devices outwardly one inch, thereby increasing the internal spacing of the devices by a two-inch increase in diameter.

The forward end of the piston 21 has a pair of projecting bosses 57 extending from the left-hand end thereof on either side of the piston rod 29 to which a pair of spaced brackets 58 is secured by a plurality of cap screws 59. The brackets have a pair of links 61 secured thereon by pivots 62 and having the opposite end secured to pivots 68. Links 60, which form toggles with links 61, extend from the pivots 68 to arms 63 on clamshell-like jaws 64 where they are secured by pivots 65. The arms 63 are secured to the brackets 58 by pivots 66. Toggle actuating links 67 have one end secured to the pivots 68 and the opposite ends secured to a head 69 on the left-hand end of the piston rod 29 by pivots 71. The pivots 71 are retained in the head by a cotter pin 72 extending through notches provided in the side wall thereof. When fluid is expelled from the cylinders 19 and 28, the piston 21 is moved to the left by the spring 27, while the piston 31 is moved to the right by the spring 32. This latter movement opens the jaws 64, while the former movement advances the jaws into gripping position.

After a tire has been placed within the area outlined by the jaws, fluid is first introduced into the cylinder 28 to advance the piston 31 and rod 29 to the left, thereby closing the jaws, as illustrated in Fig. 4. Thereafter, fluid is introduced into the cylinder 19, moving the piston 27 and rod 21 to the right, thereby moving the jaws 64 therewith and stretching the tire an amount controlled by the stop ring 24 adjusted through the setscrew 25. The brackets 58, as illustrated more specifically in Figs. 4 and 8, have an arm 73 secured thereto in position to extend on either side of the bracket 52 to prevent the brackets 58 and jaw 64 from rotating relative to the bracket. After the tire has been stretched and a rim placed therein, fluid is first conducted from the cylinder 28 to permit the piston 31 to move to the right and thereby open the jaws 64 to permit the tire to retract upon the rim, after which fluid is conducted from the cylinder 19, permitting the piston 21 and jaws to again be moved into clamping position.

Figure 2:
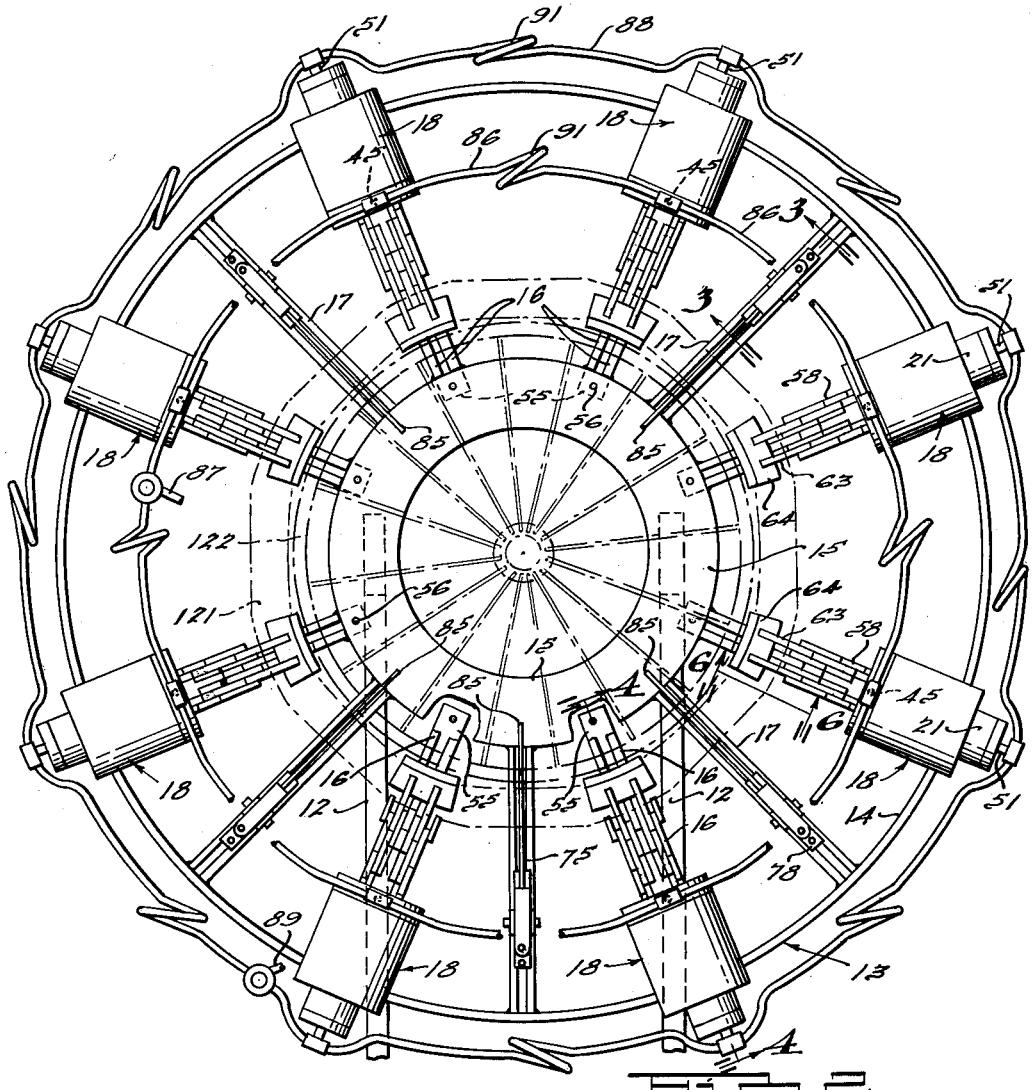
Fig. 2 is a broken plan view of the structure illustrated in Fig. 1, as viewed from line 2—2 thereof.
Figure 3:
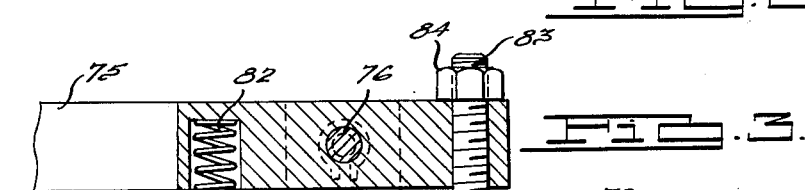
Fig. 3 is an enlarged sectional view of the structure illustrated in Fig. 2, taken on the line 3—3 thereof.

The two lowermost stretching devices 18, as illustrated in Fig. 2, are provided with locating plates 74 for positioning the tire relative to the jaws of the lowermost cylinders and substantially concentric to the center of the base 13 when the tire is disposed within the area outlined by the jaws. The tires also rest upon the ends of arms 75 which are pivoted on a pin 76 between a pair of plates 77 which are welded or otherwise secured to a base plate 78. The base plate is secured by screws 79 to a pair of spaced spokelike bars 17 when extending through a bottom plate 81 for drawing the base plate 78 against the top surface of the bars. The arm 75 is biased in a clockwise direction by a spring 82 to a position limited by an adjustable screw 83 which is locked in adjusted position by a nut 84. Tire supporting ends 85 of the arms project upwardly to be positioned between the jaws for supporting the tire and rim in a plane centrally of the jaws.

When the tire is placed upon the ends 85 of the arms, it will be located in the plane of the jaws and be concentric with the center of the base 13 when abutting the plates 74 in the lowermost gripping and stretching devices 18. The plurality of conduits 45 on the cylinders 19 are interconnected by conduits 86 having communication with a supply conduit 87. The conduits 51 on the end of the cylinders 28 are interconnected with each other by conduits 88 which are connected to a supply circuit by a conduit 89. The conduits 88 are either resilient or provided with a coil 91 to provide resiliency to permit the piston 21 to be advanced and retracted in the cylinder 19. Similarly, the conduits 86 are made of flexible material or provided with a coil 91 to permit the cylinder to be adjusted upon the spokelike pairs of rods 16 when changed for different diameter tires and rims.

Referring more particularly to Figs. 1, 5, 7 and 9, wherein the control circuit by which the tire applying device is operated, is illustrated, the standards 12 support a manifold 93 and the plate 11 supports a manifold 94. The supply line 95 is connected to the manifold 94 from a main air line or other fluid supply source, from which it passes to an air filter 96, from which it is conducted through an oiler 97 and then by a conductor 97 to a fluid actuated valve 98 and by a conduit 99 to a foot-operated valve 101. From the foot-operated valve 101, air is conducted through a conduit 104 to the manifold 93 and through the conduit 89 to the cylinder 28. Storage tank 103 provides an auxiliary supply of air for cylinders 28, and tank 111 provides an auxiliary air supply for cylinder 19. The fluid from the conduit 104 passes downwardly through a needle valve 105, through the conduit 106, through the check valve 107, to the conduit 108. The fluid from the conduit 108 passes into the valve 98 and operates the valve to conduct air from the conduit 97, through conduit 87 to the cylinders 19. A rod 112 is connected to the valve 101 and to a foot-operated lever 113. The valves 98 and 101 are mounted on projecting bosses 114 on the manifold 93 by U bolts 115. Clamping feet 116 may be secured to the plate 11 for securing the device on a floor. Fluid from the conduit 108 also passes through a check valve 117, conduit 118 and a needle valve 119 to the manifold 93 where it may pass through the conduit 104 to the valve 101 and to atmosphere.

When a tire 121 is to be applied to a rim, it is placed within the area of the jaws 64 on the ends 85 of the arm 75 resting against the plate 74 on the bottom clamping and stretching devices 18. The foot lever 113 is then pressed downwardly to open the valve 101 to permit air to go to the cylinders 28, causing the jaws to clamp the tire. Fluid will also pass through the conduit 104, needle valve 105, conduit 106 and the check valve 107 to the conduit 108 to operate the valve 98. Through the setting of the needle valve 105, the delivery of fluid from the conduit 97 to the valve 98 may be delayed a desired amount. Air passing from the valve 98 will pass through the conduit 87 to the cylinders 19 to retract the jaws, thereby stretching the tire 121. This delayed operation of the piston 22 in the cylinder 19 is very slight so that the gripping and stretching of the tire are practically simultaneous. After the tire has been stretched, a rim 122 is then placed upon the projecting ends 85 of the arms 75 and the foot lever 113 is then released, returning the valve 101 to its initial position, connecting the conduits 89 and 104 to atmosphere. This will immediately release the air from the cylinders 28, permitting the springs 32 to retract the piston rod 29 and open the jaws 64, releasing the tire 121 which retracts against the rim 122, thereby completing the tire applying operation. At this point the tire and rim may be removed from the machine. Air in the conduit 108 which retains the valve 98 in the operating position, passes from the conduit 108, the check valve 117, the conduit 118, past the needle valve 119 and to the conduit 104, from which it is conducted into the valve 101 and to atmosphere through the exhaust port 110. This permits the valve 98 to return to its initial position, closing off the supply from the conduit 97 and connecting the supply from conduit 87 to atmosphere through the exhaust port 120. This permits the spring 27 to return the piston 22 to the forward end of the cylinder 19, thereby returning the jaws to their initial positions, ready for the next tire applying operation.

Thus, by the simple operation of placing a tire in the device in the area between the jaws, pressing the foot lever 113, placing a rim within the area and releasing the foot lever, a tire is automatically stretched and applied to the rim. The machine, as pointed out hereinabove, is universal in operation in that the gripping and stretching devices may be adjusted axially to fit various sizes of tires and rims, and as no turning or twisting torque is applied to the tire either when being stretched or released for retraction with the tread, the tire snaps straight onto the rim parallel therewith. The adjustment is preferably made by template plates which accurately locate the jaws relative to each other and the center of the device. Similar axial adjustment may be made of the supporting arms 75, utilizing similar templates therefor.

What is claimed is:

1. A tire applying device embodying a base plate having radially disposed supporting elements thereon, tire gripping and stretching devices applied to said supporting elements, jaws on said devices positioned annularly about the center of the base, means on the devices for opening and closing the jaws, means on said devices for moving the jaws radially outward when closed for stretching the tire, a fluid circuit for operating said moving means in sequence, and positioning means for locating the tire in a position in the plane of the jaws.

2. A tire applying device embodying a base plate having radially disposed supporting elements thereon, tire gripping and stretching devices applied to said supporting elements, jaws on said devices positioned annularly about the center of the base, means on the devices for opening and closing the jaws, means on said devices for moving the jaws radially outward when closed for stretching the tire, a fluid circuit for operating said jaws and moving means in sequence, positioning means for locating the tire in a position in the plane of the jaws, and additional locating means provided on the jaws for positioning the tire centrally thereof.

3. A tire applying device embodying a base plate having radially disposed supporting elements thereon, tire gripping and stretching devices applied to said supporting elements, jaws on said devices positioned annularly about the center of the base, means on the devices for opening and closing the jaws, means on said devices for moving the jaws radially outward when closed for stretching the tire, a fluid circuit for operating said jaws and moving means in sequence, positioning means for locating the tire in a position in the plane of the jaws, additional locating means provided on the jaws for positioning the tire centrally thereof, and means for preventing the jaws from turning out of a common plane when being moved radially outward and inward.

4. In a tire applying device, a plurality of annularly spaced jaws movable to closed position for gripping a tire and to open position for releasing the tire, means for moving said jaws radially outwardly for stretching the tire after the tire is gripped thereby, means for moving said jaws to open position when retained in tire stretched position for releasing said tire, means for supporting a rim in the plane of said stretched tire and substantially concentric thereto, means for adjusting said jaws and moving means radially of said device for operating on tires of different diameters, and means for adjusting said rim supporting means.

5. In a tire applying device, a base having a plurality of radially disposed slots therein, cylinders adjustably supported on said base through said slots, jaw means for gripping a tire, carried by each of said cylinders, means for operating said jaws for gripping a tire means for moving said jaws radially outward after a tire is gripped for stretching a tire, template plates for locating said cylinders in said slots an equi-distance from the center of said base, at least one of said jaws having a tire centering element carried thereby, and additional supporting elements for the tire carried by the base for locating the tire in the plane of said jaws.

6. In a tire applying device, a base having a plurality of radial slots, cylinders adjustably mounted on the base through said slots, a piston and piston rod carried by each of said cylinders, said piston rod having a cylinder therein, a second piston and piston rod in said second cylinder, jaws carried by said first cylinder and actuated by said second piston and piston rod to open and closed positions, and a fluid circuit for actuating said pistons for closing the jaws and for thereafter moving the jaws outwardly to stretch a tire gripped thereby.

7. In a tire applying device, a base having a plurality of radial slots, cylinders adjustably mounted on the base through said slots, a piston and piston rod carried by each of said cylinders, said piston rod having a cylinder therein, a second piston and piston rod in said second cylinder, jaws carried by said first cylinder and actuated by said second piston and piston rod to open and closed positions, and a fluid circuit for actuating said pistons for closing the jaws and for thereafter moving the jaws outwardly to stretch a tire gripped thereby, said fluid circuit having control means therein for operating the second piston and piston rod first to close the jaws to grip the tire and for operating the first piston and piston rod thereafter to move the jaws outwardly to thereby stretch the tire.

8. In a tire applying device, a base having a plurality of radial slots, cylinders adjustably mounted on the base through said slots, a piston and piston rod carried by each of said cylinders, said piston rod having a cylinder therein, a second piston and piston rod in said second cylinder, jaws carried by said first cylinder and actuated by said second piston and piston rod to open and closed positions, a fluid circuit for actuating said pistons for closing the jaws and for thereafter moving the jaws outwardly to stretch a tire gripped thereby, said fluid circuit having control means therein for operating the second piston and piston rod first to close the jaws to grip the tire and for operating the first piston and piston rod thereafter to move the jaws outwardly to thereby stretch the tire, and locating means for positioning the tire in the plane of the jaws and centrally thereof.

9. In a tire applying device, a base having a plurality of radial slots, cylinders adjustably mounted on the base through said slots, a piston and piston rod carried by each of said cylinders, said piston rod having a cylinder therein, a second piston and piston rod in said second cylinder, jaws carried by said first cylinder and actuated by said second piston and piston rod to open and closed positions, a fluid circuit for actuating said pistons for closing the jaws and for thereafter moving the jaws outwardly to stretch a tire gripped thereby, said fluid circuit having control means therein for operating the second piston and piston rod first to close the jaws to grip the tire and for operating the first piston and piston rod thereafter to move the jaws outwardly to thereby stretch the tire, locating means for positioning the tire in the plane of the jaws and centrally thereof, and means on said cylinder and second piston and piston rod for retaining said jaws in a common plane.

10. In a gripping and clamping device, a plurality of which are employed to grip and stretch a tire to enlarge its diameter, a cylinder, a piston rod and piston carried by the cylinder, the piston rod having a cylinder therein, a second piston and rod in said second cylinder, and pivoted jaws carried by said first cylinder and actuated by the piston rod of said second cylinder to closed and open positions.

11. In a gripping and clamping device, a plurality of which are employed to grip and stretch a tire to enlarge its diameter, a cylinder, a piston rod and piston carried by the cylinder, the piston rod having a cylinder therein, a second piston and rod in said second cylinder, pivoted jaws carried by said first cylinder and actuated by the piston rod of said second cylinder to closed and open positions, a sleeve within said first cylinder about the piston rod therein on the side of the piston remote from said jaws, and a spring between said sleeve and cylinder wall for moving the piston toward the jaw supporting end of the cylinder, said cylinder on the jaw supporting end containing a port for the introduction of fluid for moving the piston to compress said spring.

12. In a gripping and clamping device, a plurality of which are employed to grip and stretch a tire to enlarge its diameter, a cylinder, a piston rod and piston carried by the cylinder, the piston rod having a cylinder therein, a second piston and rod in said second cylinder, and pivoted jaws carried by said first cylinder and actuated by the piston rod of said second cylinder to closed and open positions, said second piston having means for preventing its rotation relative to said first cylinder.

13. In a tire applying device, a plurality of annularly spaced pairs of jaws for gripping a tire, means for opening and closing each said pair of jaws, means for moving said pairs of jaws when closed about a tire radially outwardly for stretching the tire, said means for operating each of said pairs of jaws actuating each jaw of the pair simultaneously a like amount for releasing both sides of the tire simultaneously to prevent the tire from being twisted or moved from its plane when released.

PAUL DOUGLAS MIZE.

REFERENCES CITED

The following references are of record in the file of this patent:

UNITED STATES PATENTS

| Number | Name | Date |
| --- | --- | --- |
| 1,353,078 | Smith | Sept. 14, 1920 |
| 1,437,085 | Banta | Nov. 28, 1922 |
| 1,578,760 | Replogle | Mar. 30, 1926 |
| 1,822,501 | Onsrud | Sept. 8, 1931 |
| 1,877,787 | Argabrite | Sept. 20, 1932 |
| 2,277,640 | Harrington | Mar. 24, 1942 |
| 2,432,139 | Crowley | Dec. 9, 1947 |
| 2,484,879 | Ernst | Oct. 18, 1949 |
| 2,485,166 | Repas | Oct. 18, 1949 |